(12) United States Patent
Hamada et al.

(10) Patent No.: US 7,605,843 B2
(45) Date of Patent: Oct. 20, 2009

(54) MONITORING APPARATUS

(75) Inventors: Takahiro Hamada, Yokohama (JP);
Takuma Kawamura, Komae (JP);
Fuminori Watanabe, Matsudo (JP);
John Alexenko, Woodland Hills, CA (US)

(73) Assignee: Gaintech Co. Limited, Grand Cayman (KY)

( * ) Notice: Subject to any disclaimer, the term of this patent is extended or adjusted under 35 U.S.C. 154(b) by 0 days.

(21) Appl. No.: 12/348,808

(22) Filed: Jan. 5, 2009

(65) Prior Publication Data
US 2009/0102928 A1 Apr. 23, 2009

Related U.S. Application Data

(63) Continuation of application No. 10/587,709, filed as application No. PCT/JP2006/300795 on Jan. 13, 2006.

(51) Int. Cl.
*H04N 17/00* (2006.01)
*H04N 17/02* (2006.01)

(52) U.S. Cl. ...................... 348/192; 348/193
(58) Field of Classification Search ................ 348/192, 348/180, 193, 177, 700–702, 607, 608; 714/712–717; 370/241; 375/224–228; 382/190, 191
See application file for complete search history.

(56) References Cited

U.S. PATENT DOCUMENTS

| | | | | |
|---|---|---|---|---|
| 5,473,361 A | * | 12/1995 | Penney | 725/143 |
| 6,246,435 B1 | * | 6/2001 | Patel | 348/192 |
| 6,496,221 B1 | * | 12/2002 | Wolf et al. | 348/192 |
| 6,943,827 B2 | * | 9/2005 | Kawada et al. | 348/180 |
| 7,154,533 B2 | | 12/2006 | Sheldon et al. | |
| 7,161,617 B2 | | 1/2007 | Moote et al. | |
| 7,385,627 B2 | * | 6/2008 | Sugimoto et al. | 348/192 |
| 7,478,004 B2 | | 1/2009 | Chan et al. | |
| 2002/0184645 A1 | | 12/2002 | Austin et al. | |
| 2007/0088516 A1 | | 4/2007 | Wolf et al. | |

FOREIGN PATENT DOCUMENTS

JP 2003-204562 7/2003

OTHER PUBLICATIONS

English Patent Abstract of JP2003204562, from esp@cenet, published on Jul. 18, 2003, 1 page.

* cited by examiner

*Primary Examiner*—M. Lee
(74) *Attorney, Agent, or Firm*—Osha • Liang LLP

(57) ABSTRACT

A monitoring method for monitoring a video/audio signal transmitted from a transmission source to a transmission destination has a step of storing the video/audio signal transmitted from the transmission source to the transmission destination repeatedly for a predetermined time period, a step of comparing a first characteristic amount extracted from the video/audio signal before the transmission and a second characteristic amount extracted from the video/audio signal after the transmission in real time, a step of determining an error occurrence when there is a difference of a predetermined value or more between the first characteristic amount and the second characteristic amount, and a step of transmitting the stored video/audio signal to a predetermined destination when an error occurrence is determined.

20 Claims, 8 Drawing Sheets

MONITORING APPARATUS

CROSS-REFERENCE TO RELATED APPLICATIONS

This application is a continuation of, and claims the benefit, pursuant to 35 U.S.C. §120, to U.S. patent application Ser. No. 10/587,709, which was filed on Jul. 28, 2006, and which is a U.S. national phase application of PCT Application No. PCT/JP2006/300795, which was filed on Jan. 13, 2006.

BACKGROUND OF INVENTION

1. Field of the Invention

The present invention relates to a monitoring apparatus, and more particularly, to a monitoring apparatus suitable for monitoring a digital video/audio signal.

2. Background Art

In recent years, video processing techniques have been improved, and thus a high-quality video broadcast, such as a high-definition television broadcast, has been provided. Here, digital video signals of a high-definition television broadcast, etc., are often transmitted to each home through satellite broadcasting and a cable TV network. However, an error sometimes occurs during the transmission of video signals from various causes. When an error occurs, problems, such as a video freeze, a blackout, noise, audio mute, etc., may result, and thus it becomes necessary to take countermeasures.

Under these circumstances, in Japanese Patent Application Laid-Open No. 2003-204562, the present applicant discloses, for example a signal monitoring system in which a central processing terminal calculates the difference between a first statistic value based on a video signal (first signal) output from a transmission source and a second statistic value based on a video signal (second signal) output from a relay station or a transmission destination, if the difference is below a threshold value, the transmission is determined to be normal, and if the difference is over the threshold value, a determination is made that a transmission trouble has occurred between the transmission source 10 and the relay station 20 so that a warning signal is output to raise an alarm (alarm display and alarm sound).

However, in the case of such a signal monitoring system, the central processing terminal only calculates the difference between the first statistic value and the second statistic value, and makes an automatic determination of a transmission trouble on the basis of the difference. Thus, there is a problem in that a sufficient analysis cannot be made on what kind of error has occurred from that determination. If a sufficient error analysis cannot be made, the same trouble may be brought about again. Here, in order to analyze an error, it is necessary to store all the transmitted video signals, and to check the signals while reproducing the signals later with taking time. However, in order to do that, it needs a vast amount of storage capacity for storing video/audio signals and enormous checking time.

SUMMARY OF INVENTION

One or more embodiments of the present invention to provide a monitoring system capable of analyzing the contents of the error if an error occurs.

According to one or more embodiments of the present invention, there is provided a monitoring system for monitoring a video/audio signal transmitted from a transmission source to a transmission destination, the system including: a step of storing the video/audio signal transmitted from the transmission source to the transmission destination repeatedly for a predetermined time period; a step of comparing a first characteristic amount extracted from the video/audio signal before the transmission and a second characteristic amount extracted from the video/audio signal after the transmission in real time; a step of determining an error occurrence when there is a difference of a predetermined value or more between the first characteristic amount and the second characteristic amount; and a step of transmitting the stored video/audio signal to a predetermined destination when an error occurrence is determined.

By the monitoring system according to one or more embodiments of the present invention, a video/audio signal transmitted from a transmission source to a transmission destination is stored repeatedly for a predetermined time period. Thus, for example if the video/audio signal is overwritten at predetermined timing, it is sufficient to have a small storage capacity for the video/audio signal. Also, the video/audio signal on which an error has occurred remains without being overwritten at the time of determination that an error has occurred. Accordingly, by transmitting this signal to a predetermined destination, a detailed error analysis can be made promptly on the basis of the transmitted video/audio signal. In this regard, a "video/audio signal" generally refers to a signal including both a picture signal (video signal) and a sound signal (audio signal). However, in this specification, a signal including at least one of those signals is sufficient, and it does not matter whether the signal is raw data or compressed data.

In the monitoring system, the second characteristic amount to be used for comparison and the stored video/audio signal are preferably transmitted from the transmission destination to the transmission source through the Internet.

In the monitoring system, the stored video/audio signal is preferably used for analyzing the error.

In the monitoring system, the error is preferably an image freeze phenomenon.

In the monitoring system, the error is preferably a blackout phenomenon.

In the monitoring system, the error is preferably an audio mute phenomenon.

In the monitoring system, the error is preferably an audio failure phenomenon.

In the monitoring system, the error is preferably a video/audio mismatching phenomenon.

In the monitoring system, the error is preferably an irregular frame phenomenon.

In the monitoring system, the video/audio signal transmitted to the transmission destination is preferably corrected when there is a difference of a predetermined value or more between the first characteristic amount and the second characteristic amount.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers. Further, the use of "ST" in the figures is equivalent to the use of "Step" in the detailed description below.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
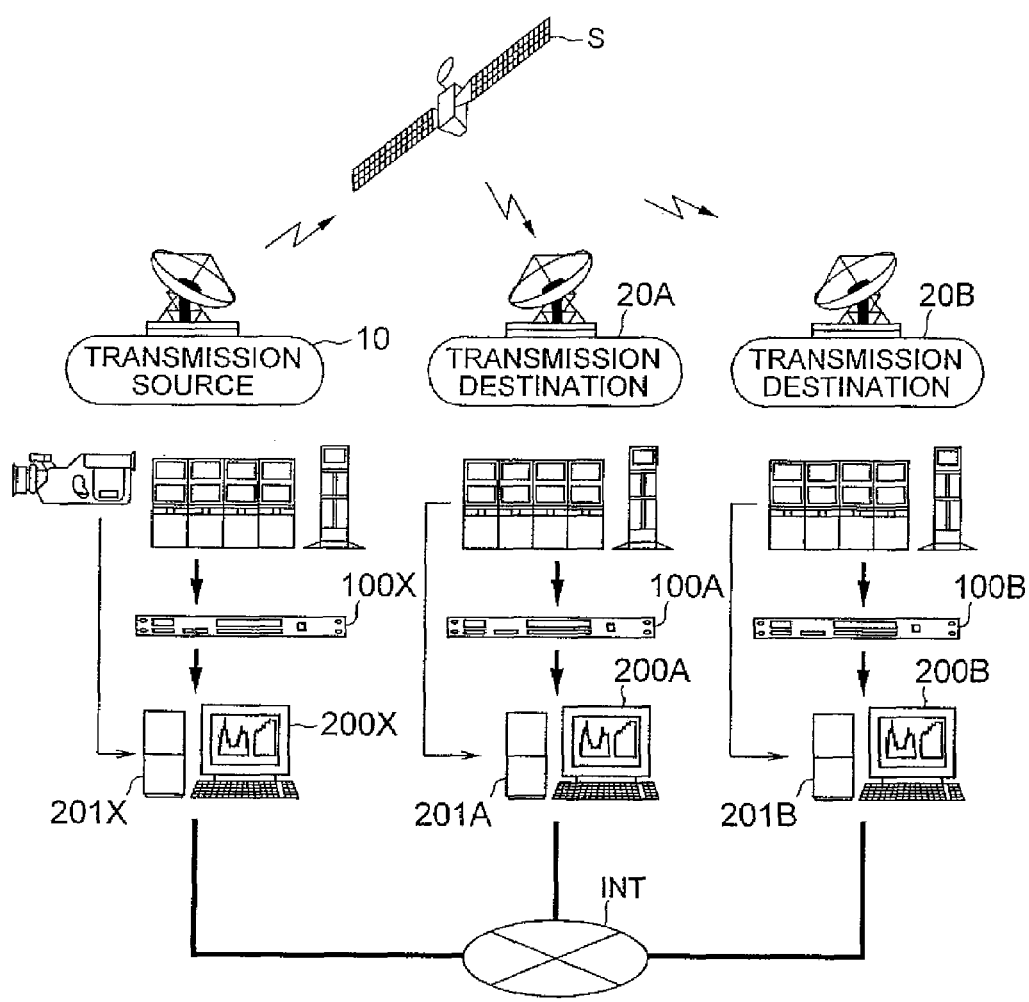
FIG. 1 is a schematic diagram of the entire transmission system including a monitoring system according to the present embodiment.

In the following, a description will be given of the present invention with reference to an embodiment. FIG. 1 is a schematic diagram of the entire transmission system including a monitoring system according to the present embodiment. In FIG. 1, consider the case where for example, a video/audio signal including an audio signal and a video signal is transmitted from a transmission source 10, such as a broadcasting station to transmission destinations 20A and 20B, such as satellite stations. An example in which the transmission of such a video/audio signal is carried out through a communication satellite S is shown. However, the transmission may be through various means, for example via optical fibers.

Figure 2:
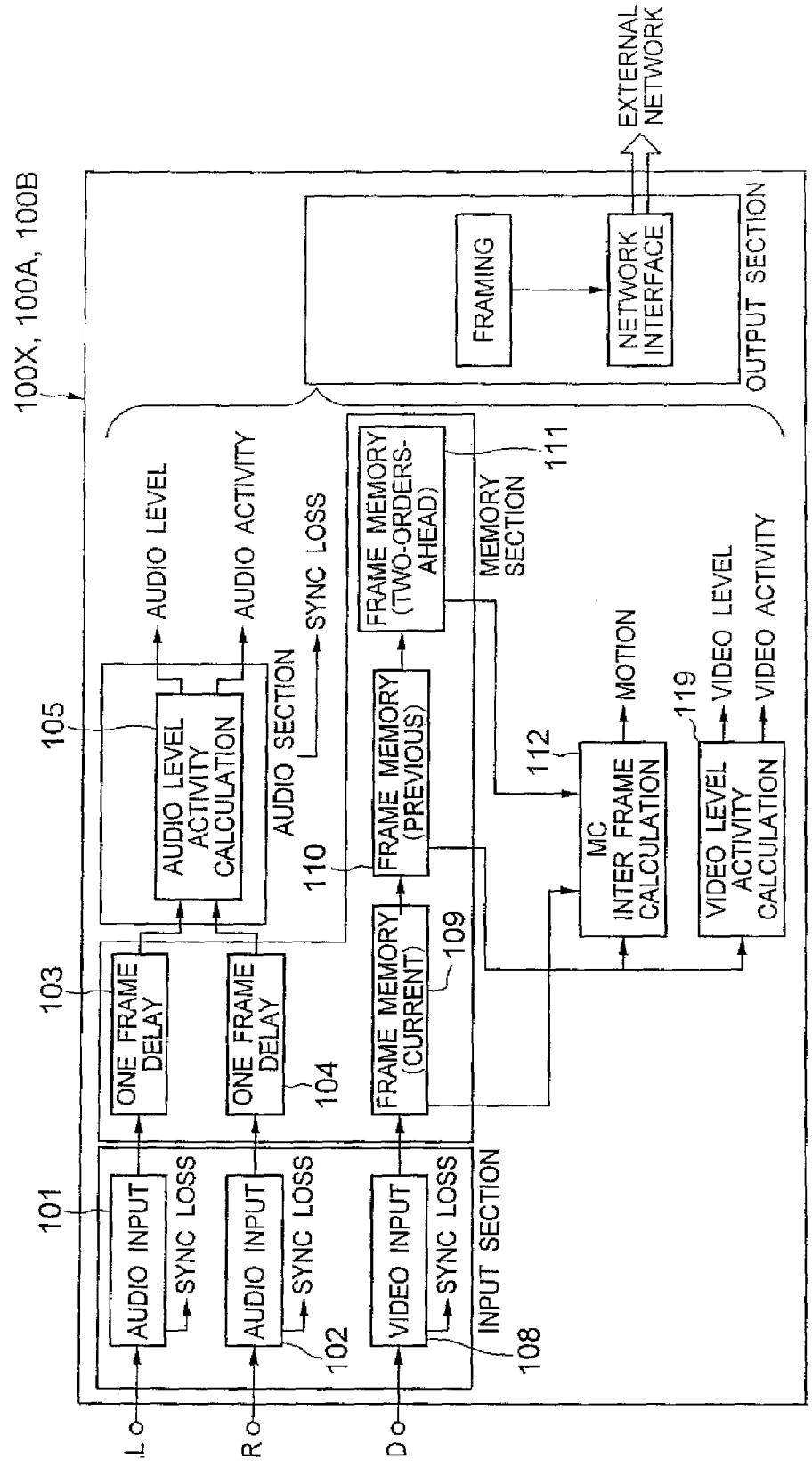
FIG. 2 is a block diagram illustrating the configuration of extraction apparatuses 100X, 100A, and 100B.

FIG. 2 is a block diagram illustrating the configuration of extraction apparatuses 100X, 100A, and 100B. Among the video/audio signals, left and right audio signals AL and AR are input into audio input sections 101 and 102, respectively. The signals output from there are input into delay sections 103 and 104, respectively. The operation result of an audio section 105 is output as audio characteristic amount (Audio Level, Audio Activity), and thus is output from the extraction apparatuses 100X, 100A, and 100B to the terminals 200X, 200A, and 200B. Here, the Audio Level means an average value of the absolute values of the audio sampling (48 KHz) values (48000/30=1600 pieces) included in one frame (for example, 30 frames/s) of an image. Also, the Audio Activity means a square mean value of the audio sampling (48 KHz) values (48000/30=1600 pieces) included in one frame (for example, 30 frames/s).

On the other hand, among the video/audio signals, a video signal VD is input into a video input section 108. The signal output from there is input into frame memories 109, 110, and 111. The frame memory 109 stores the current frame, the frame memory 110 stores the previous frame, and the frame memory 111 stores the frame before two.

The output signals from the frame memories 109, 110, and 111 are input into an MC calculation section 112, and the calculation result thereof is output as the characteristic amount (Motion) of the video. At the same time, the output signal from the frame memory 110 is input into a video calculation section 119. The calculation result of the video calculation section 119 is output as the characteristic amount (Video Level, Video Activity) of the video. These output signals are output from the extraction apparatuses 100X, 100A, and 100B to the terminals 200X, 200A, and 200B. Here, the Motion is calculated as follows. For example, an image frame is divided into 8 pixels □ 8 line-size small blocks, the average value and the variance of the 64 pixels are calculated for each small block, and the Motion is represented by the difference between the average value and the variance of the blocks of the same place of the frame before N, and indicates the movement of the image. Note that N is normally any one of 1, 2, and 4. Also, the Video Level is the average value of the pixel values included in an image frame. Furthermore, for the Video Activity, when a variance is obtained for each small block included in an image, the average value of the variances of the pixels included in a frame may be used. Alternatively, the variance of the pixels in a frame included in an image frame may simply be used.

Next, a description will be given of the operation of this monitoring system. The video/audio signal before being transmitted from the transmission source 10 is input into the extraction apparatus 100X extracting a characteristic amount (meta data) therefrom, and is stored into the video server 201X while being overwritten for a predetermined time period.

On the other hand, the previous video/audio signal having been transmitted to the transmission destinations 20A and 20B is input into the extraction apparatuses 100A and 100B which extract characteristic amounts therefrom, respectively, and is stored into the video servers 201A and 201B while being overwritten for a predetermined time period (a step of storing the video/audio signal transmitted from the transmission source to the transmission destination repeatedly for a predetermined time period). The extracted characteristic amount is transmitted from the terminals 200A and 200B to the terminal 200X of the transmission source 10 through the Internet INT.

The terminal 200X of the transmission source 10 compares, in real time, the characteristic amount extracted by the extraction apparatus 100X and the characteristic amounts transmitted from the terminals 200A and 200B (a step of comparing, in real time, the first characteristic amount extracted from the video/audio signal before transmission and the second characteristic amount extracted from the video/audio signal after transmission). If there is a difference of a predetermined value or more, a determination is made that an error has occurred (a step of determining that an error has occurred if there is a difference of a predetermined value or more between the first characteristic amount and the second characteristic amount), the terminal 200X transmits an instruction to the terminals 200A and 200B through the Internet INT. The terminals 200A and 200B clip the video/audio signal of the past 10 seconds from the current point in time from the video servers 201A and 2018 in response to this instruction, and transmit the video clip to the terminal 200X of the transmission source 10 through the Internet INT (a step of transmitting the stored video/audio signal to a predetermined destination when a determination is made that an error has occurred).

An operator of the transmission source 10 can compare the video/audio signal transmitted from the terminals 200A and 200B to the terminal 200X and the video/audio signal stored in the video server 201X, and analyze the cause of the error. In this regard, the terminal 200X may transmit the characteristic amount of the video/audio signal before the transmission to the terminals 200A and 200B through the Internet NT, and the transmission destinations may compare the characteristic amounts.

Next, a more detailed description will be given of errors.

(1) Detection of Image Freeze Phenomenon

Figure 3A:
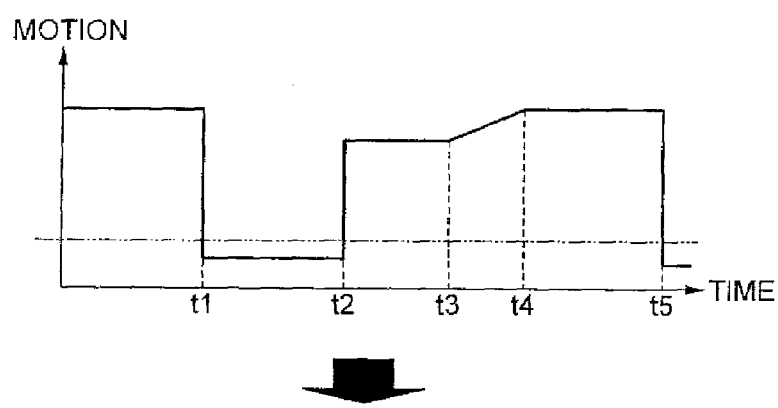
FIG. 3A is a diagram showing the characteristic amount extracted by the extraction apparatus 100X.
Figure 3B:
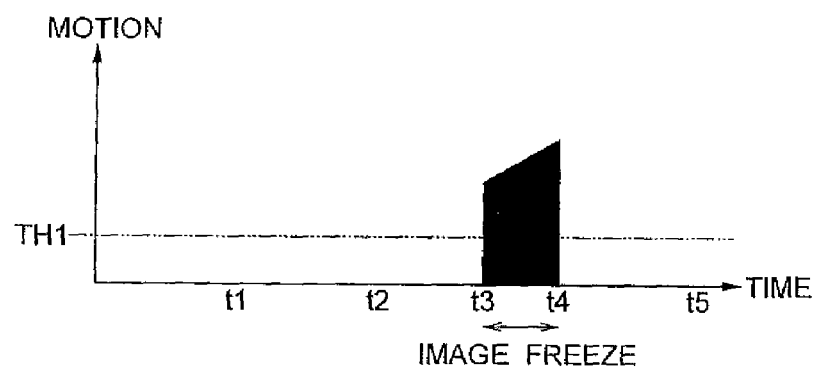
FIG. 3B is a diagram showing the value of a difference between the two characteristic amounts.
Figure 3C:
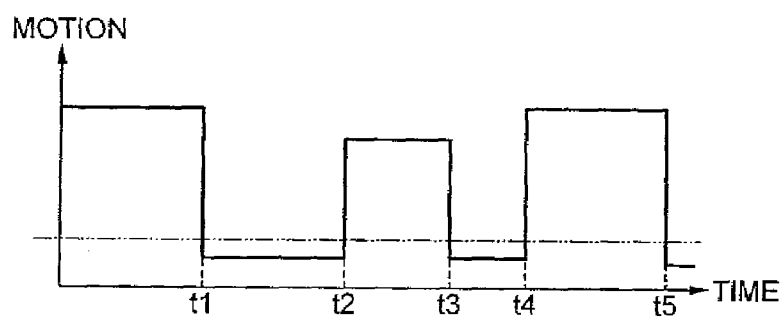
FIG. 3C is a diagram showing the characteristic amount extracted by the extraction apparatus 100A or 100B.

FIG. 3A is a diagram showing the characteristic amount extracted by the extraction apparatus 100X. FIG. 3C is a diagram showing the characteristic amount extracted by the extraction apparatus 100A or 100B. FIG. 3B is a diagram showing the value of a difference between the two characteristic amounts. The vertical axis represents a motion [value] as a characteristic amount, and the horizontal axis represents time.

Here, as shown in FIG. 3C, the motion [value] is low during the time t1 to t2 in the video based on the video/audio signal after the transmission. As shown in FIG. 3A, the motion [value] is also low during the time t1 to t2 in the video based on the video/audio signal before the transmission, and thus the difference between the two is zero (refer to FIG. 3B). This has occurred, because the transmitted picture is a still image. Accordingly, it can be determined that an image freeze phenomenon has not occurred.

On the other hand, as shown in FIG. 3C, the motion [value] is low during the time t3 to t4 in the video based on the video/audio signal after the transmission. However, as shown in FIG. 3A, the motion [value] is high during the time t3 to t4 in the video based on the video/audio signal before the transmission, and thus the difference between the two exceeds a threshold value TH1 (refer to FIG. 3B). This is due to the fact that an image freeze phenomenon has occurred because of some cause. The terminal 200X of the transmission source 10, which has detected this fact, transmits an instruction to transmit the video clip immediately to the transmission destination terminal 200A or 200B, in which the problem has occurred.

(2) Detection of Blackout Phenomenon

Figure 4A:
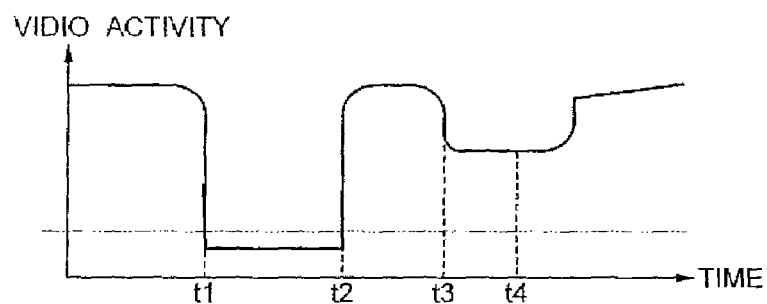
FIG. 4A is a diagram showing the characteristic amount extracted by the extraction apparatus 100X.
Figure 4A:
Figure 4B:
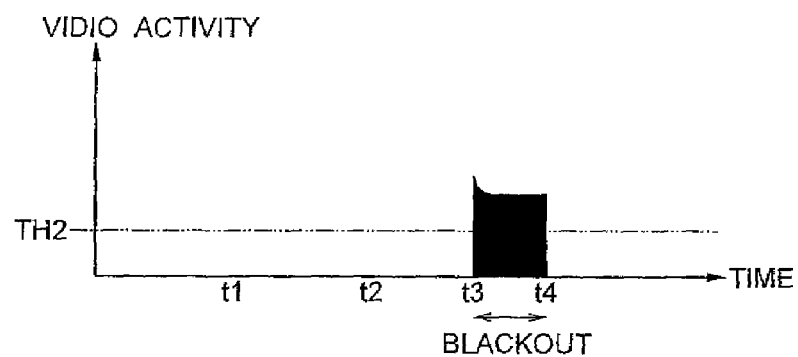
FIG. 4B is a diagram showing the value of a difference between the two characteristic amounts.
Figure 4B:
Figure 4C:
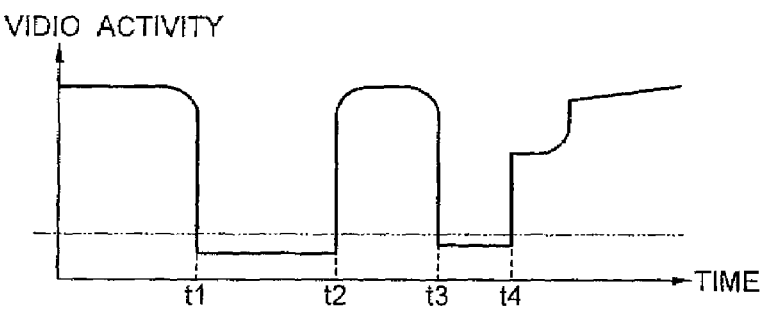
FIG. 4C is a diagram showing the characteristic amount extracted by the extraction apparatus 100A or 100B.

FIG. 4A is a diagram showing the characteristic amount extracted by the extraction apparatus 100X. FIG. 4C is a diagram showing the characteristic amount extracted by the extraction apparatus 100A or 100B. FIG. 4B is a diagram showing the value of a difference between the two characteristic amounts. The vertical axis represents a Video Activity [value] as a characteristic amount, and the horizontal axis represents time. For this Video Activity [value], for example the following variance A can be used.

Considering the video signals (assuming the case of having values for individual three-dimensional coordinate values such as a virtual video signal. Note that the signals become two-dimensional video signals assuming that z=0) before and after the transmission, it is assumed that the video signal at the three-dimensional coordinate (x, y, z) at time t before the transmission is V (x, y, z, t), and the video signal at the three-dimensional coordinate (x, y, z) at time t after the transmission is U (x, y, z, t).

Here, if a video signal is transmitted over a long distance, various problems, such as a signal loss, noise, etc., might occur, and thus it is not always true that V (x, y, z, t)=U (x, y, z, t). It is not necessary to correct an error if viewers are not aware of the error. However, problems, such as a blackout phenomenon, need the countermeasures.

The variance A as the characteristic amount of the video signal V (x, y, z, t) can be represented by the following expression.

$$\text{Variance } A = \frac{1}{XYZT}\sum_{x=1}^{X}\sum_{y=1}^{Y}\sum_{z=1}^{Z}\sum_{t=1}^{T}\{V(x,y,z,t) - ave.V\}^2$$

Also, the average value ave. V can be obtained by the following expression.

$$\text{Average } ave.V = \frac{1}{XYZT}\sum_{x=1}^{X}\sum_{y=1}^{Y}\sum_{z=1}^{Z}\sum_{t=1}^{T}V(x,y,z,t)$$

The variance A is obtained for each of the video signal V (x, y, z, t) before the transmission and the video signal U (x, y, z, t) after the transmission. Then the difference between the two is obtained, and thus a blackout is determined as follows.

As shown in FIG. 4C, the variance value is low during the time t1 to t2 in the video based on the video/audio signal after the transmission. As shown in FIG. 4A, the variance value is also low during the time t1 to t2 in the video based on the video/audio signal before the transmission, and thus the difference between the two is zero (refer to FIG. 4B). This has occurred, because the transmitted picture is, for example a picture of a starry sky. Accordingly, it can be determined that an image freeze phenomenon has not occurred.

On the other hand, as shown in FIG. 4C, the variance value is low during the time t3 to t4 in the video based on the video/audio signal after the transmission. However, as shown in FIG. 4A, the variance value is high during the time t3 to t4 in the video based on the video/audio signal before the transmission, and thus the difference between the two exceeds a threshold value TH2 (refer to FIG. 4B). This is due to the fact that a blackout phenomenon of having an all-black screen has occurred because of some cause. The terminal 200X of the transmission source 10, which has detected this fact, transmits an instruction to transmit the video clip immediately to the transmission destination terminal 200A or 200B, in which the problem has occurred.

(3) Detection of Audio Mute Phenomenon

Figure 5A:
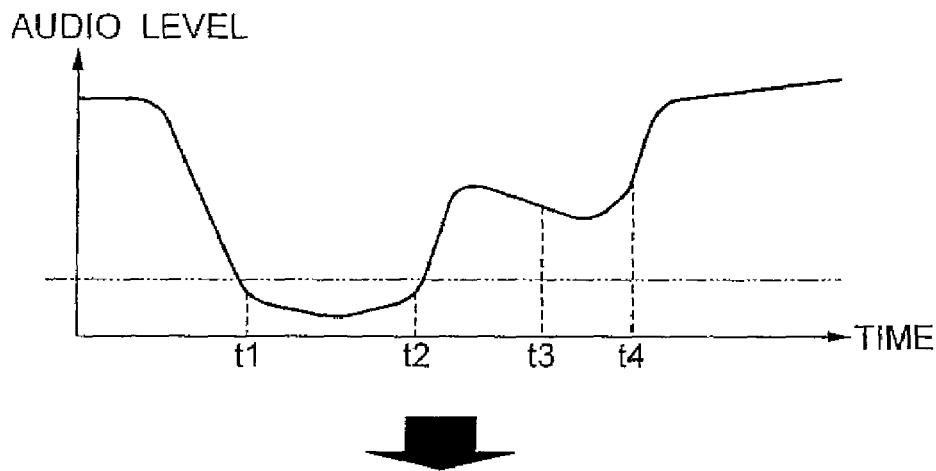
FIG. 5A is a diagram showing the characteristic amount extracted by the extraction apparatus 100X.
Figure 5B:
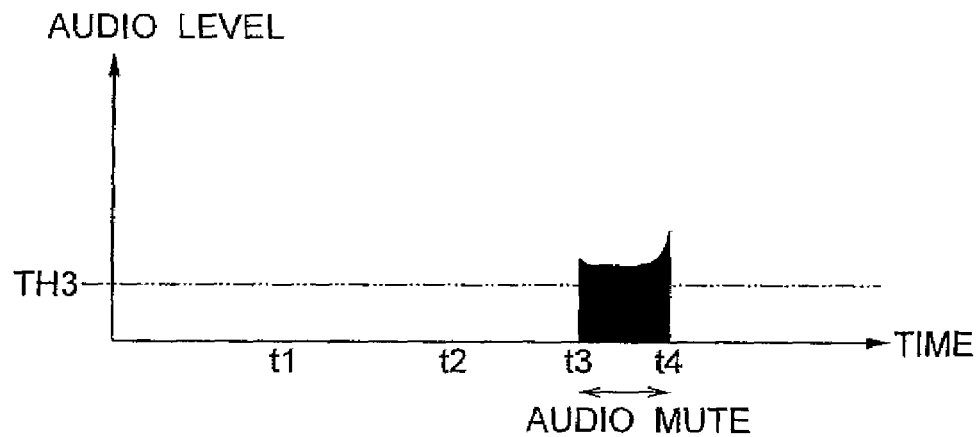
FIG. 5B is a diagram showing the value of a difference between the two characteristic amounts.
Figure 5C:
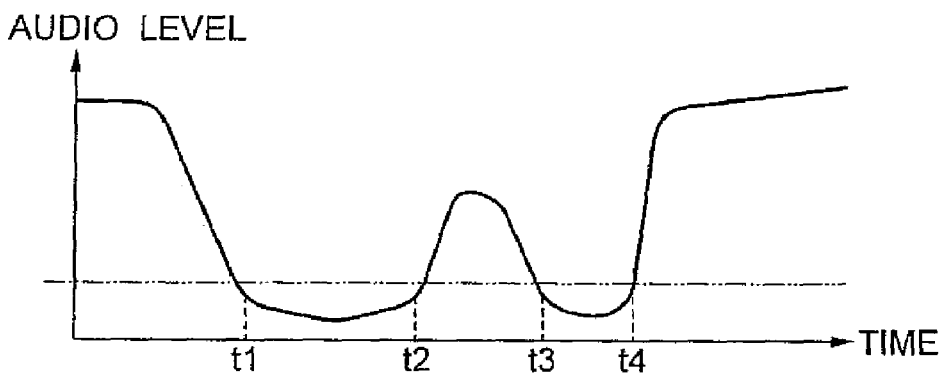
FIG. 5C is a diagram showing the characteristic amount extracted by the extraction apparatus 100A or 100B.

FIG. 5A is a diagram showing the characteristic amount extracted by the extraction apparatus 100X. FIG. 5C is a diagram showing the characteristic amount extracted by the extraction apparatus 100A or 100B. FIG. 58 is a diagram showing the value of a difference between the two characteristic amounts. The vertical axis represents an Audio Level [value] as a characteristic amount, and the horizontal axis represents time. In this regard, the sampling of the Audio Level [value] of the audio signal is preferably leveled off by the frame frequency of the video signal. For example, in the case of a video signal having 30 frames per one second, the sampling of the Audio Level [value] is preferably performed by 30 Hz.

Here, as shown in FIG. 5C, the Audio Level [value] is very low during the time t1 to t2 in the audio based on the video/audio signal after the transmission. As shown in FIG. 5A, the Audio Level [value] is also low during the time t1 to t2 in the audio based on the video/audio signal before the transmission, and thus the difference between the two is zero (refer to FIG. 5B). This has occurred, because the Audio Level [value] of the video/audio signal before transmission is originally low. Accordingly, it can be determined that an audio mute phenomenon has not occurred.

On the other hand, as shown in FIG. 5C, the Audio Level [value] is low during the time t3 to t4 in the audio based on the video/audio signal after the transmission. However, as shown in FIG. 5A, the Audio Level [value] is high during the time t3 to t4 in the audio based on the video/audio signal before the transmission, and thus the difference between the two exceeds a threshold value TH3 (refer to FIG. 5B). This is due to the fact that an audio mute phenomenon has occurred because of some cause. The terminal 200X of the transmission source 10, which has detected this fact, transmits an instruction to transmit the video clip immediately to the transmission destination terminal 200A or 200B, in which the problem has occurred.

(4) Detection of Audio Failure Phenomenon

Figure 6A:
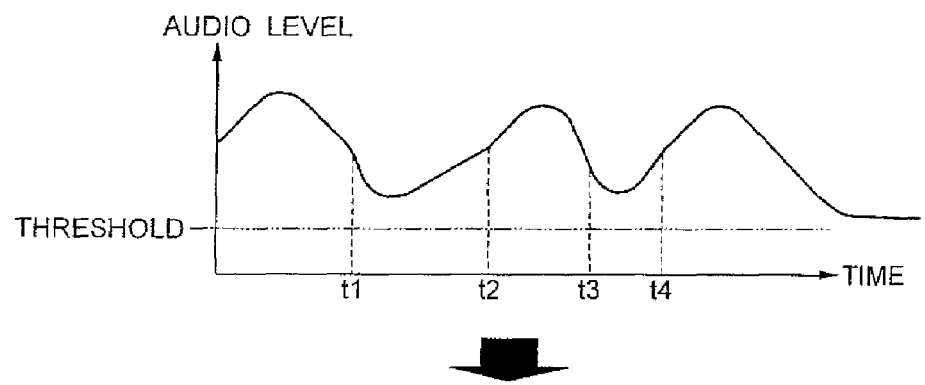
FIG. 6A is a diagram showing the characteristic amount extracted by the extraction apparatus 100X.
Figure 6B:
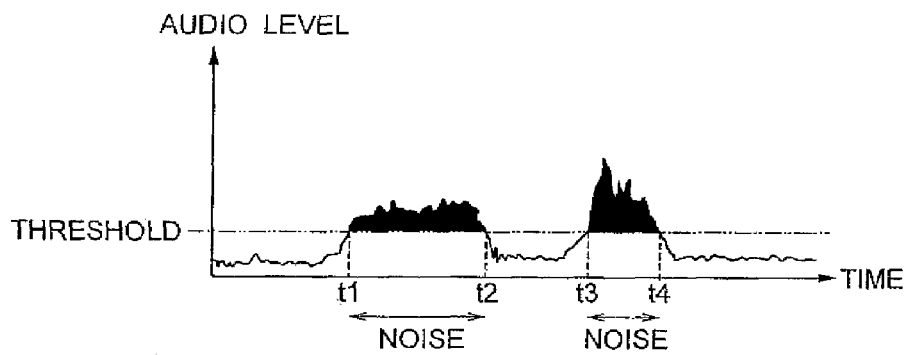
FIG. 6B is a diagram showing the value of a difference between the two characteristic amounts.
Figure 6C:
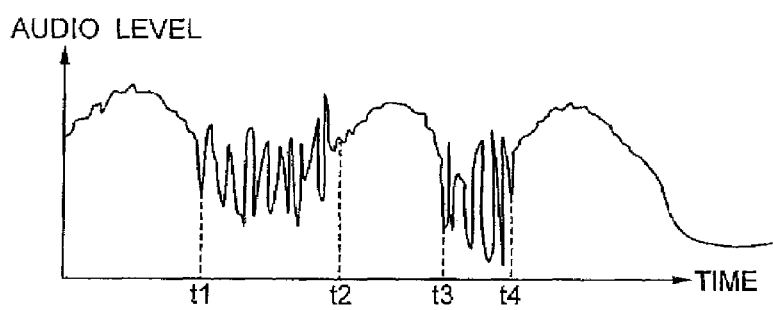
FIG. 6C is a diagram showing the characteristic amount extracted by the extraction apparatus 100A or 100B.

FIG. 6A is a diagram showing the characteristic amount extracted by the extraction apparatus 100X. FIG. 6C is a diagram showing the characteristic amount extracted by the extraction apparatus 100A or 100B. FIG. 6B is a diagram showing the value of a difference between the two characteristic amounts. The vertical axis represents an Audio Level [value] as a characteristic amount, and the horizontal axis represents time. In this regard, the sampling of the Audio Level [value] of the audio signal is preferably leveled off by the frame frequency of the video signal.

Here, when the difference between the Audio Level [value] based on the video/audio signal after the transmission and the Audio Level [value] based on the video/audio signal before the transmission is obtained, as shown in FIG. 6B, the difference between the two exceeds a threshold value TH4 during the time t1 to t2 and the time t3 to t4. This is due to the fact that an audio failure phenomenon has occurred by an overlap of noise, etc., because of some cause. The terminal 200X of the transmission source 10, which has detected this fact, transmits an instruction to transmit the video clip immediately to the transmission destination terminal 200A or 200B, in which the problem has occurred.

(5) Detection of Video/Audio Mismatching Phenomenon

Figure 7A:
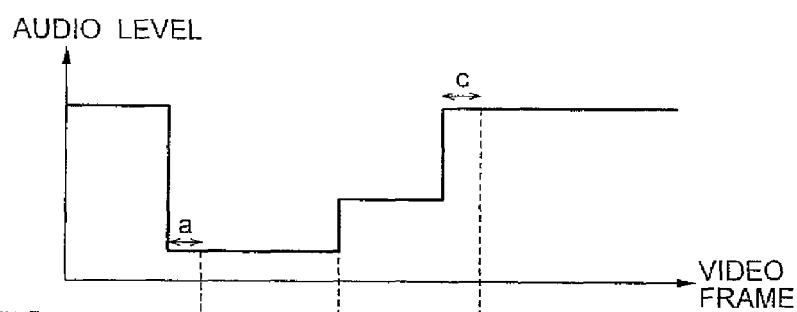
FIG. 7A is a diagram showing the characteristic amount extracted by the extraction apparatus 100X.
Figure 7B:
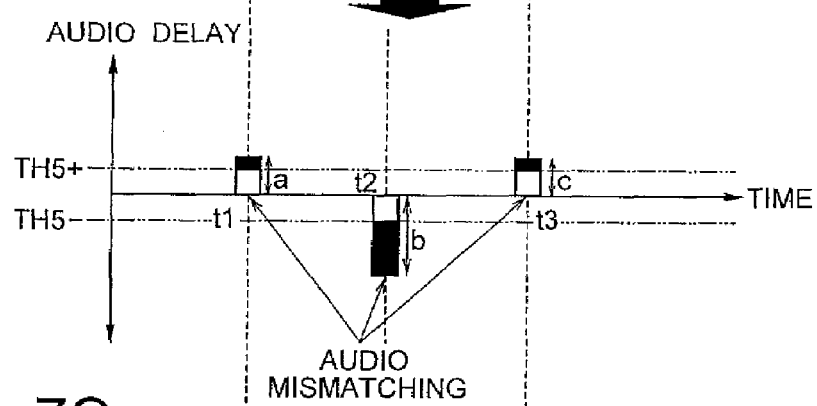
FIG. 7B is a diagram showing the value of a difference between the two characteristic amounts.
Figure 7C:
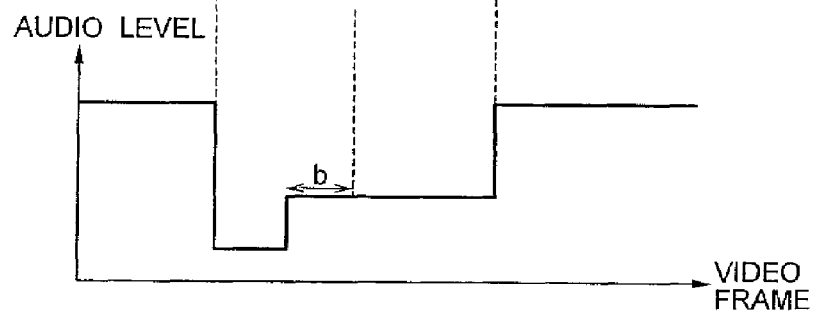
FIG. 7C is a diagram showing the characteristic amount extracted by the extraction apparatus 100A or 100B.

FIG. 7A is a diagram showing the Audio Level [value] extracted by the extraction apparatus 100X in response to a video frame. FIG. 7C is a diagram showing the Audio Level [value] extracted by the extraction apparatus 100A or 100B. FIG. 7B is a diagram showing an audio advance/delay regarding time. In this regard, the sampling of the Audio Level [value] of the audio signal is preferably leveled off by the frame frequency of the video signal.

Here, rises of the Audio Level [value] with respect to a frame are detected, and compared. As shown in FIG. 7B, the audio delay amount with respect to video exceeds a threshold value TH5+ at the time t1 and t3, and the audio advance amount with respect to video is below a threshold value TH5− at the time t2. The terminal 200X of the transmission source 10, which has determined that a video/audio mismatching phenomenon has occurred by detecting either of the two, transmits an instruction to transmit the video clip immediately to the transmission destination terminal 200A or 200B, in which the problem has occurred.

(6) Detection of Irregular Frame Phenomenon

Figure 8A:
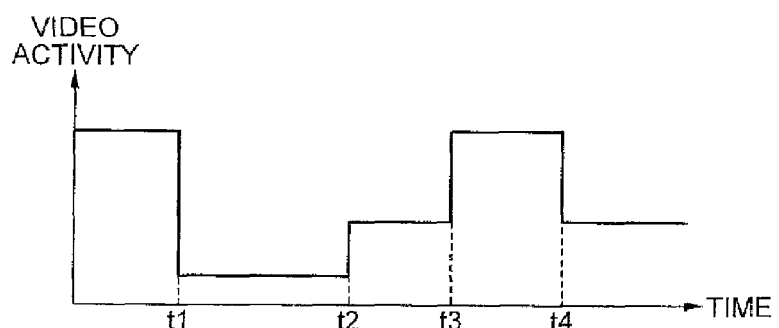
FIG. 8A is a diagram showing the characteristic amount extracted by the extraction apparatus 100X.
Figure 8B:
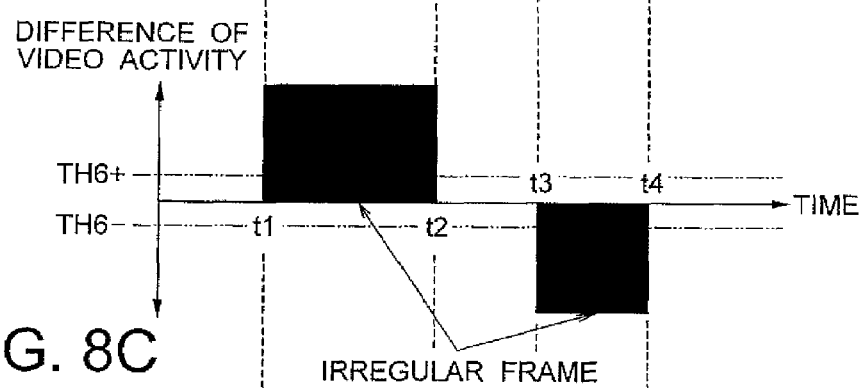
FIG. 8C is a diagram showing the characteristic amount extracted by the extraction apparatus 100A or 100B.
Figure 8C:
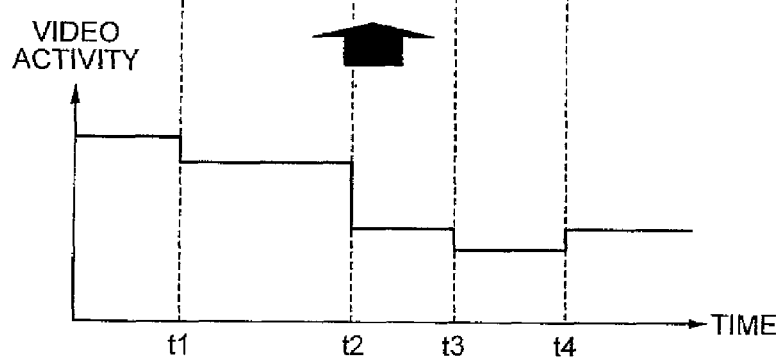

FIG. 5A is a diagram showing the characteristic amount extracted by the extraction apparatus 100X. FIG. 8C is a diagram showing the characteristic amount extracted by the extraction apparatus 100A or 100B. FIG. 5B is a diagram showing the value of a difference between the two characteristic amounts. The vertical axis represents a Video Level [value] (the above-described variance may be used) as a characteristic amount, and the horizontal axis represents time.

When the video based on the video/audio signal before the transmission completely matches the video based on the video/audio signal after the transmission, the difference of the statistic values of the image values becomes zero. However, if a video signal of one frame is inserted into the video/audio signal after the transmission, the difference exceeds a predetermined threshold value.

As shown in FIG. 5B, the difference of the statistic values of the pixel values exceeds a threshold value TH6+ during the time t1 to t2, and the difference of the statistic values of the pixel values is below a threshold value TH6− during the time t3 to t4. The terminal 200X of the transmission source 10, which has determined that an irregular frame phenomenon has occurred by detecting either of the two, transmits an instruction to transmit the video clip immediately to the transmission destination terminal 200A or 200B, in which the problem has occurred.

In this regard, after the transmission source 10 has analyzed an error, for example, if an irregular frame phenomenon occurs, the terminal 200X of the transmission source can transmit an instruction to eliminate the misalignment between the video signal and the audio signal to the transmission destination terminal 200A or 200B. The transmission destination terminal 200A or 200B can perform the processing on the video/audio signal to eliminate the misalignment between the video signal and the audio signal. Such an instruction can be transmitted to the transmission destination terminals all together using the Internet.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A monitoring method for monitoring a video/audio signal transmitted from a transmission source to a transmission destination, the method comprising:
    a step of storing the video/audio signal transmitted from the transmission source to the transmission destination repeatedly for a predetermined time period;
    a step of comparing a first characteristic amount extracted from the video/audio signal before the transmission and a second characteristic amount extracted from the video/audio signal after the transmission in real time;
    a step of determining an error occurrence when there is a difference of a predetermined value or more between the first characteristic amount and the second characteristic amount; and
    a step of transmitting the stored video/audio signal to a predetermined destination when an error occurrence is determined.

2. The monitoring method according to claim 1, wherein the second characteristic amount to be used for comparison and the stored video/audio signal are transmitted from the transmission destination to the transmission source through the Internet.

3. The monitoring method according to claim 1, wherein the stored video/audio signal is used for analyzing the error.

4. The monitoring system method according to claim 1, wherein the error is an image freeze phenomenon.

5. The monitoring system method according to claim 1, wherein the error is a blackout phenomenon.

6. The monitoring method according to claim 1, wherein the error is an audio mute phenomenon.

7. The monitoring method according to claim 1, wherein the error is an audio failure phenomenon.

8. The monitoring method according to claim 1, wherein the error is a video/audio mismatching phenomenon.

9. The monitoring method according to claim 1, wherein the error is an irregular frame phenomenon.

10. The monitoring method according to claim 1, wherein the video/audio signal transmitted to the transmission destination is corrected when there is a difference of a predetermined value or more between the first characteristic amount and the second characteristic amount.

11. The monitoring method according to claim 2, wherein the stored video/audio signal is used for analyzing the error.

12. The monitoring method according to claim 2, wherein the error is an image freeze phenomenon, a blackout phenomenon, an audio mute phenomenon, an audio failure phenomenon, a video/audio mismatching phenomenon, or an irregular frame phenomenon.

13. The monitoring method according to claim 3, wherein the error is an image freeze phenomenon, a blackout phenomenon, an audio mute phenomenon, an audio failure phenomenon, a video/audio mismatching phenomenon, or an irregular frame phenomenon.

14. The monitoring method according claim 2, wherein the video/audio signal transmitted to the transmission destination is corrected when there is a difference of a predetermined value or more between the first characteristic amount and the second characteristic amount.

15. The monitoring method according claim 3, wherein the video/audio signal transmitted to the transmission destination is corrected when there is a difference of a predetermined value or more between the first characteristic amount and the second characteristic amount.

16. The monitoring method according claim 11, wherein the video/audio signal transmitted to the transmission destination is corrected when there is a difference of a predetermined value or more between the first characteristic amount and the second characteristic amount.

17. The monitoring method according claim 4, wherein the video/audio signal transmitted to the transmission destination is corrected when there is a difference of a predetermined value or more between the first characteristic amount and the second characteristic amount.

18. The monitoring method according claim 5, wherein the video/audio signal transmitted to the transmission destination is corrected when there is a difference of a predetermined value or more between the first characteristic amount and the second characteristic amount.

19. The monitoring method according claim 6, wherein the video/audio signal transmitted to the transmission destination is corrected when there is a difference of a predetermined value or more between the first characteristic amount and the second characteristic amount.

20. The monitoring method according claim 7, wherein the video/audio signal transmitted to the transmission destination is corrected when there is a difference of a predetermined value or more between the first characteristic amount and the second characteristic amount.

* * * * *

UNITED STATES PATENT AND TRADEMARK OFFICE
CERTIFICATE OF CORRECTION

PATENT NO. : 7,605,843 B2  Page 1 of 1
APPLICATION NO. : 12/348808
DATED : October 20, 2009
INVENTOR(S) : Takahiro Hamada et al.

It is certified that error appears in the above-identified patent and that said Letters Patent is hereby corrected as shown below:

In Claim 4, Column 9, Line 6, the word "system" should be omitted.

In Claim 5, Column 9, Line 8, the word "system" should be omitted.

Signed and Sealed this

Twenty-second Day of December, 2009

David J. Kappos
*Director of the United States Patent and Trademark Office*